(12) United States Patent
Tsai et al.

(10) Patent No.: US 7,974,358 B2
(45) Date of Patent: Jul. 5, 2011

(54) ORTHOGONAL FREQUENCY DIVISION MULTIPLEXING (OFDM) ENCODING AND DECODING METHODS AND SYSTEMS

(75) Inventors: Chang-Lan Tsai, Yilan County (TW); Chang-Lung Hsiao, Taipei (TW); Ren-Jr Chen, Sanchong (TW); Char-Dir Chung, Pingzhen (TW)

(73) Assignee: Industrial Technology Research Institute, Hsinchu (TW)

( * ) Notice: Subject to any disclaimer, the term of this patent is extended or adjusted under 35 U.S.C. 154(b) by 941 days.

(21) Appl. No.: 11/586,654

(22) Filed: Oct. 26, 2006

(65) Prior Publication Data

US 2007/0258533 A1 Nov. 8, 2007

Related U.S. Application Data

(60) Provisional application No. 60/796,886, filed on May 3, 2006, provisional application No. 60/796,884, filed on May 3, 2006, provisional application No. 60/813,704, filed on Jun. 15, 2006.

(51) Int. Cl.
*H04L 5/12* (2006.01)
(52) U.S. Cl. ........ 375/262; 375/265; 375/260; 375/299; 375/341; 375/347
(58) Field of Classification Search .................. 375/262, 375/265, 260, 299, 341, 347
See application file for complete search history.

(56) References Cited

U.S. PATENT DOCUMENTS

| | | | |
|---|---|---|---|
| 6,088,398 A | | 7/2000 | Wahlqvist et al. |
| 6,928,047 B1 * | | 8/2005 | Xia ............................. 370/206 |
| 6,999,503 B1 | | 2/2006 | Vadde |
| 2003/0073464 A1 * | | 4/2003 | Giannakis et al. ............ 455/562 |
| 2003/0185310 A1 * | | 10/2003 | Ketchum et al. .............. 375/259 |
| 2005/0229091 A1 * | | 10/2005 | Narayanan et al. ........... 714/801 |
| 2006/0013326 A1 * | | 1/2006 | Yoshida ....................... 375/260 |

* cited by examiner

*Primary Examiner* — Kabir A Timory
(74) *Attorney, Agent, or Firm* — Finnegan, Henderson, Farabow, Garrett & Dunner, LLP

(57) ABSTRACT

An orthogonal frequency division multiplexing (OFDM) system provided for communication includes an OFDM transmitter and an OFDM receiver. The OFDM transmitter may be configured to transmit OFDM signals through a communication channel and may include a channel encoder configured to encode a plurality of information bits and an interleaver configured to interleave the channel-encoded information bits. The OFDM transmitter may also include a mapper configured to map the interleaved channel-encoded information bits into mapped multi-level symbols. The OFDM transmitter may also include a dispersive encoder that is configured to dispersively encode the mapped symbols. The OFDM receiver may be configured to receive the transmitted OFDM signals and to decode the received OFDM signals iteratively based on soft decision methods.

17 Claims, 7 Drawing Sheets

ORTHOGONAL FREQUENCY DIVISION MULTIPLEXING (OFDM) ENCODING AND DECODING METHODS AND SYSTEMS

RELATED APPLICATIONS

This application claims the benefit of U.S. Provisional Application No. 60/796,886, filed May 3, 2006, U.S. Provisional Application No. 60/796,884, filed May 3, 2006, and U.S. Provisional Application No. 60/813,704, filed Jun. 15, 2006. The contents of all above applications are incorporated in their entirety herein by reference.

TECHNICAL FIELD

The present invention generally relates to orthogonal frequency division multiplexing (OFDM) technologies and, more particularly, to techniques related to dispersive OFDM coding methods and systems.

BACKGROUND

The OFDM technique distributes data over a number of spectrally overlapping and coherently orthogonal sub-carriers. Although high spectral compactness can be achieved by applying a large number of multiplexed sub-carriers or channels, pulse shaping is also important in OFDM systems. If an OFDM sub-carrier pulse is not properly shaped, sub-carriers located near band edges often interfere their adjacent channels.

An OFDM sub-carrier pulse used for transmission is often chosen to be rectangular. Forming, modulation, and demodulation of rectangular pulses can be implemented by simple and efficient techniques because the rectangular pulse shape generally leads to a sinc function (i.e., sin(x)/x) type of spectrum of the sub-carriers. However, the rectangular pulse of the OFDM sub-carrier often has relatively large power spectral side lobes that fall off as $f^{-2}$. Thus, spectral efficiency in the rectangular pulse OFDM system often is not optimized.

Certain techniques have been developed to shape the OFDM pulse to suppress side lobes. For example, U.S. Pat. No. 6,999,503 issued Feb. 14, 2006, to Vadde discloses a cyclic convolver deployed in the frequency domain which may suppress plurality of sub-symbols in the time domain to enhance the bit-rate by dropping a portion of the time domain signals. However, such conventional correlative coding techniques may introduce inter-symbol interference (ISI) and may require a separate traditional post-equalizer.

Further, in wireless communication, wireless channels often have spectral nulls occupying successive sub-carriers. Errors may be bursted if there is an error in one sub-carrier. Thus, OFDM systems with such correlative coding techniques often have relatively high bit-error rate (BER). Moreover, when a cyclic prefix is inserted in a correlatively coded OFDM signal, the waveform of the signal may be non-continuous and the OFDM system may only achieve relatively low spectral compactness.

Methods and systems consistent with certain features of the disclosed embodiments are directed to solving one or more of the problems set forth above.

SUMMARY OF THE INVENTION

One aspect of the present disclosure includes an orthogonal frequency division multiplexing (OFDM) system. The OFDM system may include an OFDM transmitter and an OFDM receiver. Further, the OFDM transmitter may be configured to transmit OFDM signals through a communication channel. The OFDM transmitter may include a channel encoder configured to encode a plurality of information bits and an interleaver configured to interleave the channel-encoded information bits. The OFDM transmitter may also include a mapper configured to map the interleaved channel-encoded information bits into mapped multi-level symbols and a dispersive encoder configured to dispersively encode the mapped symbols. Further, the OFDM receiver may be configured to receive the transmitted OFDM signals and to iteratively decode the received OFDM signals based on a soft decision method.

Another aspect of the present disclosure includes an orthogonal frequency division multiplexing (OFDM) transmitter. The OFDM transmitter may include a dispersive encoder that is configured to disperse an information symbol over a plurality of sub-carriers with various weights into a plurality of symbols. The OFDM transmitter may also include an N-point inverse fast Fourier transform (IFFT) device. The IFFT device may be coupled to the dispersive encoder and configured to modulate the encoded plurality of symbols with the plurality of sub-carriers to generate an OFDM signal. Further, a spectrum of the dispersive encoded OFDM signal may have lower side-lob power than that of a squared sinc function.

Another aspect of the present disclosure includes a method for constructing an orthonormal dispersive encoder for orthogonal frequency division multiplexing (OFDM). The method may include defining a basis set of a rectangularly pulsed OFDM signal and defining a bilinear transform. The method may also include applying the bilinear transform to the basis set of rectangularly pulsed OFDM signal and constructing a basis set containing zero-edged continuous basis signals.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
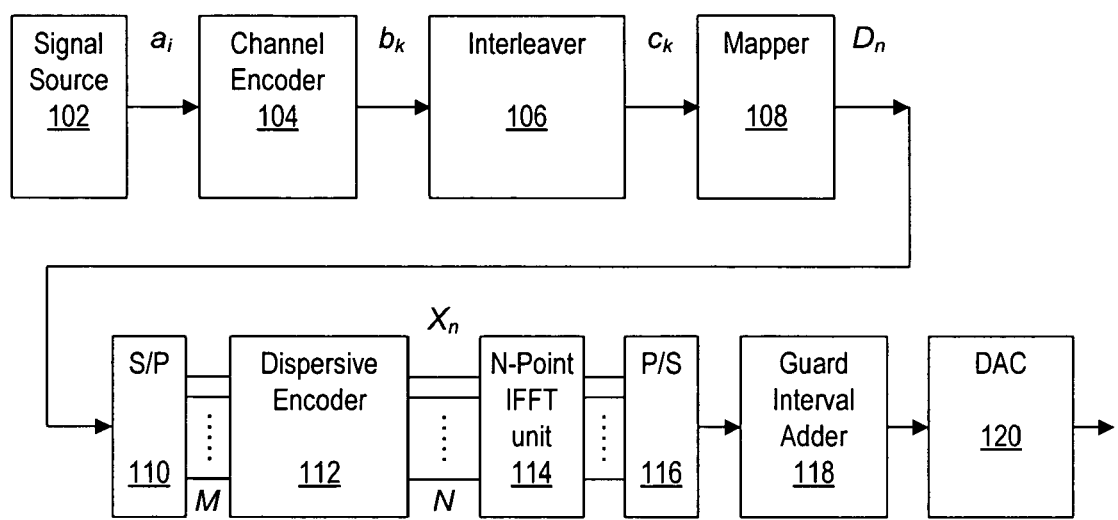
FIG. 1 shows an exemplary OFDM transmitter consistent with embodiments of the present invention.

FIG. 1 shows an exemplary OFDM transmitter 100 consistent with embodiments of the present invention. As shown in FIG. 1, OFDM transmitter 100 may include a signal source 102, a channel encoder 104, an interleaver 106, a mapper 108, a serial-to-parallel converter 110, a dispersive encoder 112, an N-point inverse fast Fourier transform (IFFT) unit 114, a parallel-to-serial converter 116, a guard interval adder 118, and a discrete-to-analog converter (DAC) 120. It is understood that the devices listed in this disclosure are for illustrative purposes, certain devices may be removed or added and the number of the devices may be changed without departing from the principles consistent with the invention. Further, any listed device or any combination of one or more listed devices may be implemented by hardware, such as programmable logic devices, field programmable gate arrays (FPGAs), customized VLSI devices, etc., and/or by software executable on a processor, such as microprocessor, digital signal processor (DSP), or a system-in-chip processing system, etc.

Signal source 102 may include any appropriate device providing a data stream to OFDM transmitter 100 for encoding, modulation, and transmission. The data stream from signal source 102 may be represented by information bits $a_i$, where i is an integer with values of 0, . . . , to the total length of the information bits. Signal source 102 may be coupled to channel encoder 104 such that information bits $a_i$ are provided to channel encoder 104.

Channel encoder 104 may include any appropriate device performing one or more channel encoding functions. For example, channel encoder 104 may include a block encoder, a convolution encoder, and/or a turbo encoder, etc. The encoded information bits may be represented by $b_k$, where k is an integer with values of 0, . . . , to the total length of encoded bits. Further, channel encoder 104 may be coupled to interleaver 106 such that encoded bits $b_k$ are provided to interleaver 106.

Interleaver 106 may include one or more appropriate interleavers, such as a random interleaver, a block interleaver, a diagonal interleaver, and/or a circular-shifting interleaver, etc., for interleaving a data sequence, e.g., rearranging the order of a data sequence in a one-to-one deterministic format. Interleaver 106 may be coupled to mapper 108 such that every $N_c$ interleaved bits may be mapped to a corresponding $2^{N_c}$-level symbol, which is denoted by $D_n$, where $N_c$ refers to the number of bits bore by the symbol $D_n$. A symbol, as used herein, may refer to a unit of information represented in a certain format, such as a digital format. A symbol may represent or bear information originally represented by, for example, information bits.

Mapper 108 may be coupled to dispersive encoder 112 through serial-to-parallel (S/P) converter 110 to convert the mapped symbols into a parallel form. Serial-to-parallel converter 110 may include any appropriate serial-to-parallel converter with a 1:M ratio. After the serial-to-parallel conversion, the converted symbols may be represented by a vector consisting of M symbols. The M symbol output from serial-to-parallel converter 110 may be further provided to dispersive encoder 112.

Dispersive encoder 112 may include any appropriate type of encoder aimed at shaping OFDM signals. A dispersive encoder, as used herein, may refer to any appropriate type of encoder to disperse an information-bearing symbol $D_n$ over several sub-carriers with different weights such that the spectrum of the resulting OFDM signal falls off faster than the spectrum of a rectangularly pulsed OFDM signal (i.e., squared sinc function). Dispersive encoder 112 may disperse an information-bearing symbol over several sub-carriers weighted by pre-selected coefficients of the encoding matrix of the dispersive encoder. Dispersing the symbol over sub-carriers may be equivalent to forming a shaping waveform in the time domain carrying the symbol.

For example, dispersive encoder 112 may include a cyclic convolver, a convolution encoder, or a pre-coding encoder, etc. Further, dispersive encoder 122 may shape the spectrum for each symbol separately. Alternatively, dispersive encoder 112 may disperse a group of symbols over a number of sub-carriers such that these sub-carriers are shared by the group of symbols. However, sub-carriers used by different groups of symbol may not be overlapped, even though the different sub-carriers may have a common feature that the envelope of the pulse shape is zero at the edges of the OFDM symbol duration.

Dispersive encoder 112 may correspond to a dispersive-encode matrix G with dimension N×M and dispersive code $[G_{m,m}, G_{m+1,m}, \ldots, G_{m+L,m}]^T$, for m=0, 1, . . . , M−1. For example, the dispersive-encode matrix constructed by linear convolution may be represented as:

$$\underline{G} = \begin{bmatrix} G_{0,0} & 0 & 0 \\ \vdots & G_{1,1} & \vdots \\ G_{L,0} & \vdots & \ddots & 0 \\ 0 & G_{L+1,1} & & G_{M-1,M-1} \\ \vdots & 0 & \ddots & \vdots \\ 0 & & & G_{N-1,M-1} \end{bmatrix}, \quad (1)$$

where there are L+1 nonzero coefficients in each column, and L is defined the order of the dispersive code. For this case, L=N−M, (L≧0).

Dispersive encoder 112 may encode the mapped symbols $\underline{D}_q = [D_{qM}, D_{qM+1}, \ldots, D_{qM+M-1}]^T$ to generate dispersively encoded signal $\underline{X}_q = G\underline{D}_q$, where $\underline{X}_q = [X_{qN}, X_{qN+1}, \ldots, X_{qN+N-1}]^T$, and q is an integer with values of 0, . . . , to the total number of blocks of encoded symbols. Also, as used herein, the underline of a denotation may reflect that the denotation is a vector or matrix. Further, dispersive encoder 112 may be coupled to inverse fast Fourier transform (IFFT) unit 114 to convert the resulting N outputs ($\underline{X}_q$) from dispersive encoder 112 to OFDM signals.

IFFT unit 114 may include any appropriate device performing inverse fast Fourier transform functions. IFFT unit 114 may also be referred to as an N-point IFFT in that IFFT unit 114 may perform modulation for N number of orthogonal sub-carriers of OFDM transmitter 100 in parallel. That is, IFFT unit 114 may modulate N symbols onto N orthogonal sub-carriers.

Further, the OFDM signals outputted from IFFT unit 114 for the N number of sub-carriers may be converted to a serial signal sequence by parallel-to-serial (P/S) converter 116. The converted signal sequence may be provided to guard interval adder 118 to add guard intervals to prevent errors caused by multi-path distortion. For example, a guard interval may be a cyclic or periodic extension of the basic OFDM symbol. In one embodiment, the last $N_g$ samples may be extended to the data sequence as a guard interval. For example, the last $N_g$ samples may be copied and prefixed to the front of the N samples.

Further, optionally, guard interval adder 118 may be coupled with a discrete-to-analog converter (DAC) 120. Guard interval adder 118 may provide the (N+$N_g$) samples to DAC 120. DAC 120 may convert discrete signals or samples, e.g., the (N+$N_g$) samples, etc., into continuous signals for transmission. In implementation, DAC 120 may include any type of discrete-to-analog device, shaping pulse device, and/or band-pass filter device, as implemented by software, hardware, or both.

Figure 2:
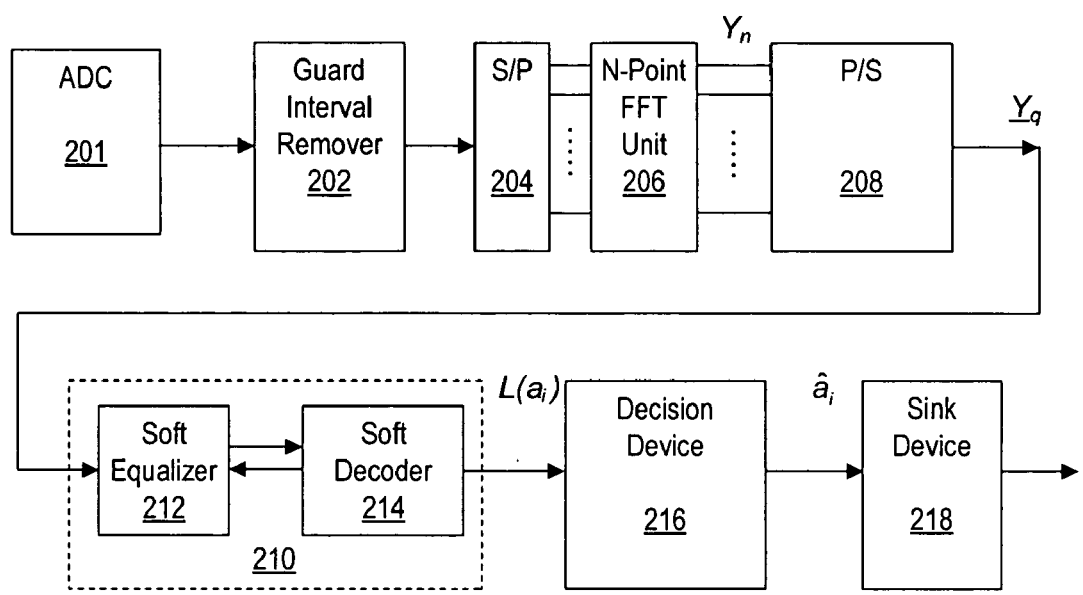
FIG. 2 shows an exemplary OFDM receiver consistent with embodiments of the invention.

The data sequence from DAC 120 or from guard interval adder 118 may then be modulated to a carrier frequency and be transmitted out through various media, such as air, wires, or cables, etc. The transmitted signals may be received by an OFDM receiver to recover the information bits $a_i$. FIG. 2 shows an exemplary OFDM receiver 200 consistent with embodiments of the invention.

As shown in FIG. 2, OFDM receiver 200 may include an analog-to-discrete converter (ADC) 201, a guard interval remover 202, a serial-to-parallel converter (S/P) 204, an N-point fast Fourier transform (FFT) unit 206, a parallel-to-serial converter 208, a turbo equalizer 210, a decision device 216, and a sink device 218.

OFDM receiver 200 receives the signals transmitted by OFDM transmitter 100. The signals received may be continuous or analog signals. ADC 201 may convert the received continuous signals into discrete samples for further processing. ADC 201 may include any appropriate analog-to-discrete converter. Further, ADC 201 may be coupled to guard interval remover 202 such that the converted discrete samples may be provided to guard interval remover 202.

Guard interval remover 202 may include any appropriate device for removing the guard interval added by, for example, guard interval adder 118. For example, guard interval remover 202 may remove the prefixed $N_g$ samples of the transmitted ($N+N_g$) samples such that only the N samples of non-redundant signals are further processed.

The received signals, with the cyclic prefix removed, may be converted by serial-to-parallel converter 204 to create blocks of N samples of OFDM signals. The N samples may be demodulated by N-point FFT unit 206 to obtain the signals from the N sub-carriers. FFT unit 206 may include any appropriate device capable performing FFT functions to demodulate OFDM signals modulated by, for example, IFFT unit 114. The transformed signals $Y_n$ may be further converted to a signal sequence by parallel-to-serial converter 208.

The signal sequence outputted by parallel-to-serial converter 208 may be represented by blocks of N samples as $\underline{Y}_q = [Y_{qN}, Y_{qN+1}, \ldots, Y_{qN+N-1}]^T$, where q is an integer with values of 0, ..., to the total number of blocks of samples, and the vector may be represented by:

$$\underline{Y}_q = \underline{H}_q G \underline{D}_q + \underline{V}_q \quad (2)$$

where the channel matrix $\underline{H}_q$ and noise vector $\underline{V}_q$ are N-point FFT representations of channel impulse response and additive noise, respectively, of the communication channel through which the signals are transmitted from OFDM transmitter 100 to OFDM receiver 200. For a slow fading channel, the channel matrix $\underline{H}_q$ may be a diagonal channel matrix. Further, the symbol $\underline{D}_n$ corresponds to $N_c$ bits $\underline{c}_n = [c_{nN_c}, c_{nN_c+1}, \ldots, c_{nN_c+N_c-1}]^T$.

Figure 3:
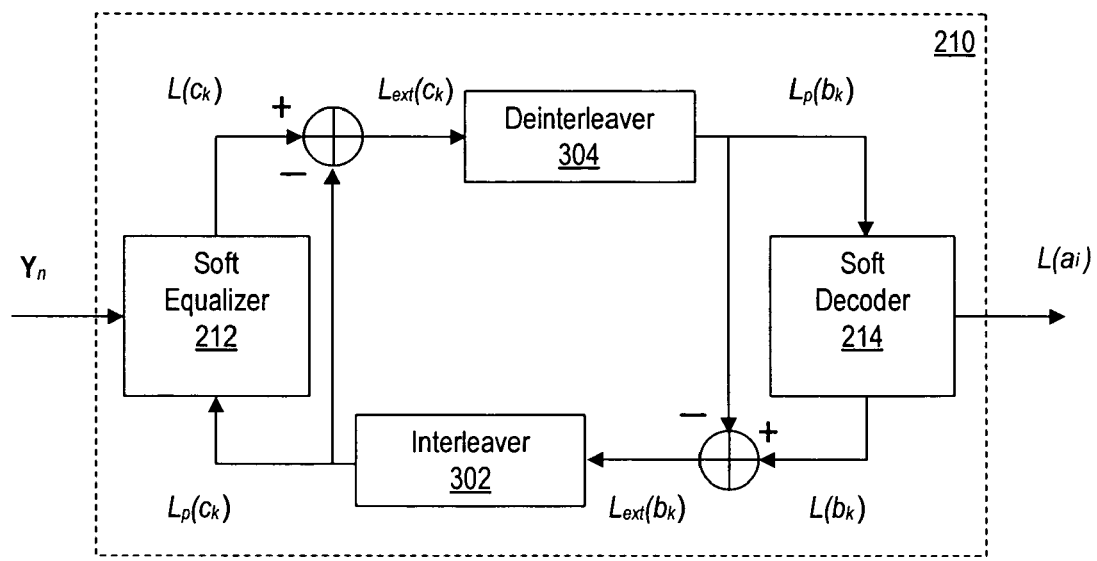
FIG. 3 shows an exemplary turbo equalizer.

Although the signals transmitted from OFDM 100 are encoded by channel encoder 104 first and further encoded by dispersive encoder 112, OFDM receiver 200 does not employ a separate channel decoder to perform channel decoding. Instead, the demodulated OFDM signal sequence is provided to turbo equalizer 210 for decoding the information bits encoded by both channel encoder 104 and dispersive encoder 112. FIG. 3 shows exemplary turbo equalizer 210 consistent with the disclosed invention.

As shown in FIG. 3, the output sequence $\{Y_n,$ for $n=0,1,\ldots\}$ is provided to turbo equalizer 210 for iterative decoding and equalizing. The term "turbo equalizer," as used herein, may refer to any appropriate equalizer capable of equalizing and/or decoding information modulated and/or encoded by a concatenation of two or more devices, which may be separated by an interleaver. Further, turbo equalizer 210 may also be treated as a turbo decoder. The term "turbo decoder," as used herein, may refer to any appropriate decoder capable of decoding information encoded by a concatenation of two or more encoders, which may be separated by an interleaver.

Turbo equalizer 210 may include a soft equalizer 212 and a soft decoder 214 coupled through an interleaver 302 and a de-interleaver 304. Soft equalizer 212 may include any appropriate type of channel equalizer capable of performing an equalization function based on a soft-decision method. The term "soft-decision method," as used herein, refers to the technique of allowing multiple versions of outputs from a logic device (e.g., a decoding device, a demodulation device, or an equalization device, etc.) to improve decoding accuracy over hard decision methods, where the output of the logic device is a binary sequence without any extrinsic information. Each version of output may be referred to as a soft estimate.

Soft equalizer 212 may, from the sequence $\{Y_n,$ for $n=0,1,\ldots\}$, obtain soft estimates, $\{L(c_k),$ for $k=0,1,\ldots\}$, of information bits $\{c_k,$ for $k=0,1,\ldots\}$, with the aid of prior information $L_p(c_k)$ of $c_k$, where L refers to the log-likelihood ratio (LLR) for a given bit in a received symbol based on the log-likelihood ratios of all the other bits in the received signal sequence. The subscript p means that the LLR represents the prior information.

Further, soft equalizer 212 may output soft estimation, $L(c_k)$, which is a logarithmic ratio of the probabilities of $c_k=0$ and $c_k=1$, i.e., $\ln(P\{c_k=0\}/P\{c_k=1\})$. The soft estimation $L(c_k)$ may be combined with prior information, $L_p(c_k)$, of $c_k$ to generate a sequence of first extrinsic information $L_{ext}(c_k) = L(c_k) - L_p(c_k)$. The sequence of extrinsic information may be provided to de-interleaver 304 and may be de-interleaved by de-interleaver 304 to generate prior information, $L_p(b_k)$, of $b_k$. The term "de-interleaver," as used herein, generally refers to performing reverse operations of an interleaver.

Similarly, estimates from de-interleaver 304, $L_p(b_k)$, may be provided to soft decoder 214. Soft decoder 214 may refer to any appropriate decoder (e.g., a turbo decoder or a convolution decoder, etc.) based on soft-decision methods. Soft decoder 214 may generate soft estimate $L(b_k)$ to be combined with $L_p(b_k)$ to generate a sequence of second extrinsic information $L_{ext}(b_k) = L(b_k) - L_p(b_k)$. Further, interleaver 302 may interleave the sequence of extrinsic information $L_{ext}(b_k) = L(b_k) - L_p(b_k)$ to generate prior information, $L_p(c_k)$, of $c_k$, to be used by soft equalizer 212 for a next iteration. After a sufficient number of iterations, soft decoder 214 may generate desired soft estimates of information bits, $L(a_i)$ which may be referred to as the logarithmic ratio of the probabilities of $a_i=0$ and $a_i=1$.

For example, when channel encoder 104 is configured with $K_1$ inputs and $K_2$ outputs, the $K_2$ prior information $[L_p(b_{iK_2}), L_p(b_{iK_2+1}), \ldots, L_p(b_{iK_2+K_2-1})]^T$ can produce soft estimates $[L(a_{iK_1}), L(a_{iK_1+1}), \ldots, L(a_{iK_1+K_1-1})]^T$ and $[L(b_{iK_2}), L(b_{iK_2+1}), \ldots, L(b_{iK_2+K_2-1})]^T$. The interleaved sequence of extrinsic information $L_{ext}(b_k) = L(b_k) - L_p(b_k)$ may be further provided to soft equalizer 212 for a next iteration. After a number of iterations, soft decoder 214 may generate the desired soft estimates $L(a_i)$ at the last iteration.

Returning to FIG. 2, the desired soft estimates $L(a_i)$ may be further provided to decision device 216 to make a decision on the information bits based on the soft estimates $L(a_i)$. Decision device 126 may include any appropriate logic device for performing decision functions of determining soft estimation and/or determining information bits based on soft estimations. For example, decision device 216 may decide $a_i=0$ if $L(a_i) \geq 0$, or $a_i=1$ if $L(a_i)<0$, and may also provide determined information bits $\hat{a}_i$ to sink device 218. Sink device 218 may include any appropriate device that further processes the information bits. Sink device 218 may process the information bits $\hat{a}_i$ as the original information bits $a_i$ and provide the processed data to other applications or devices.

Figure 4:
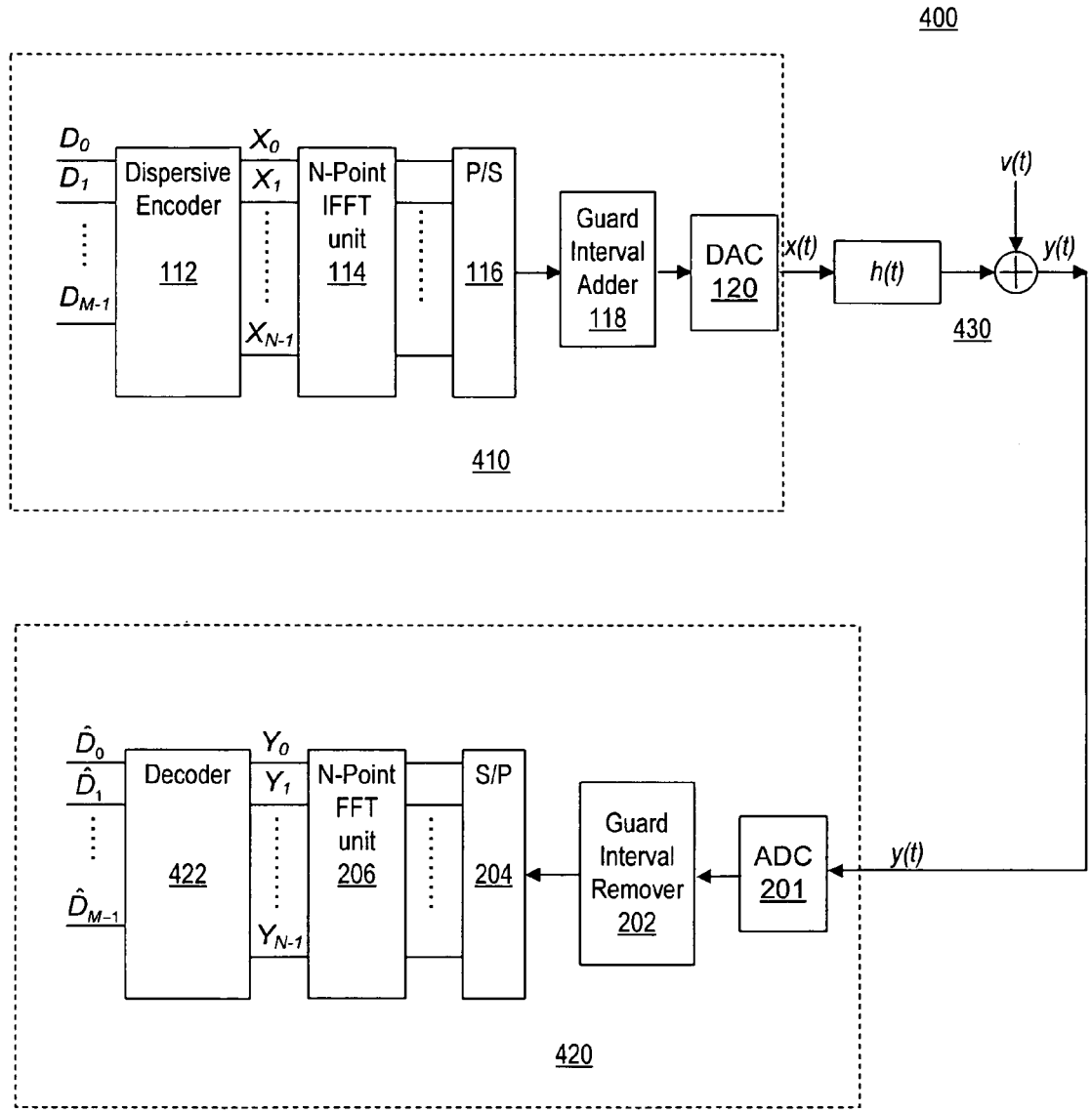
FIG. 4 shows an exemplary OFDM system with transmitting and receiving operations consistent with embodiments of the disclosed invention.

As explained above, OFDM transmitter 100 and OFDM receiver 200 may be used correspondingly in communication applications. FIG. 4 shows an exemplary OFDM system with both transmitting operations and receiving operations. As shown in FIG. 4, OFDM system 400 may include an OFDM transmitter 410 and an OFDM receiver 420. OFDM transmitter 410 may include devices described in FIG. 1 and may operate in the ways described above with respect to OFDM transmitter 100 in FIG. 1. For example, OFDM transmitter 410 may include dispersive encoder 112, N-point IFFT unit 114, parallel-to-serial (P/S) converter 116, guard interval adder 118, and discrete-to-analog converter (DAC) 120.

OFDM receiver 420, on the other hand, may include N-point FFT unit 206, serial-to-parallel converter 204, guard interval remover 202, and analog-to-discrete converter (ADC) 201, as included in FIG. 2 and described with respect to OFDM receiver 200. Further, OFDM receiver 420 may include a dispersive decoder 422, as an alternative to turbo equalizer 210. It is understood that the devices in OFDM system 400 are not intended to be limiting, and that other devices may be included, for example, to provide dispersive encoder 112 proper signals and/or to process signals from dispersive decoder 422.

As explained above, during operations of OFDM system 400, a block of M complex symbols $\underline{D}_q = [D_{qM}, D_{qM+1}, \ldots, D_{qM+M-1}]^T$ are provided to dispersive encoder 112. Dispersive encoder 112 may disperse the symbols over N sub-carriers, denoted as $\underline{X}_q = [X_{qN}, X_{qN+1}, \ldots, X_{qN+N-1}]^T$, where N and M are integers and $N \geq M$. Dispersive encoder 112 may have an encoding matrix $\underline{G} = [\underline{G}_0, \underline{G}_1, \ldots, \underline{G}_{M-1}]$ corresponding to generator matrixes of symbols transported by sub-carriers. For example, dispersive encoder 112 may separately encode each symbol with different weights as the following:

$$X_{q,m} = \begin{bmatrix} X_{qN,m} \\ X_{qN+1,m} \\ \vdots \\ X_{qN+N-1,m} \end{bmatrix} = \begin{bmatrix} G_{0,m} \\ G_{1,m} \\ \vdots \\ G_{N-1,m} \end{bmatrix} D_m = \underline{G}_m D_{qM+m}, \quad (3)$$

for $m = 0, 1, \ldots, M-1$.

The m-th symbol $D_m$ is carried by the n-th sub-carrier if $G_{n,m} \neq 0$.

The encoded symbols are outputted from dispersive encoder 112 and provided to N-point IFFT unit 114. N-point IFFT unit 114 may modulate the encoded symbols with N sub-carriers, equally spaced by $\omega_d = 2\pi/T_d$, where $T_d$ is defined as a useful OFDM symbol duration.

Figure 5:
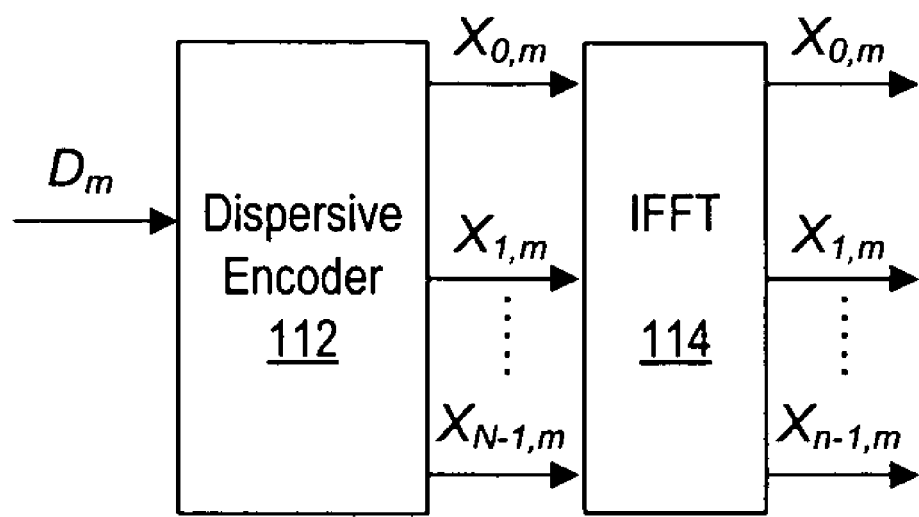
FIG. 5 shows an exemplary implementation of a dispersive encoder.

FIG. 5 shows an exemplary per-symbol dispersive encoder configuration. As shown in FIG. 5, for the m-th symbol $D_m$, the modulated OFDM signal outputted from IFFT device 114 may be represented by:

$$x_{qN+n,m} = \frac{1}{\sqrt{N}} \sum_{k=0}^{N-1} X_{qN+k,m} e^{\frac{j2\pi kn}{N}} \quad (4)$$

$$= D_{qM+m} \frac{1}{\sqrt{N}} \sum_{k=0}^{N-1} G_{k,m} e^{\frac{j2\pi kn}{N}}$$

$$= D_{qM+m} g_{n,m},$$

and $$\underline{x}_{q,m} = [x_{qN,m}, x_{qN+1,m}, \ldots, x_{qN+N-1,m}]^T \quad (5)$$

$$= D_{qM+m} \underline{g}_m.$$

where $$\underline{g}_m = [g_{0,m}, g_{1,m}, \ldots, g_{N-1,m}]^T.$$

Returning to FIG. 4, the M symbols are separately encoded and modulated by dispersive encoder 112 and IFFT unit 114, respectively. The M dispersively encoded and modulated sequences $\underline{x}_{q,m}$, for $m=0, 1, \ldots, M-1$, are converted by parallel-to-serial converter 116 to become an OFDM symbol sequence, which may be further summed for transmission:

$$\underline{x}_q = [x_{qN}, x_{qN+1}, \ldots, x_{qN+N-1}]^T \quad (6)$$

$$= \sum_{m=0}^{M-1} \underline{x}_{q,m}$$

$$= \sum_{m=0}^{M-1} D_{qM+m} \underline{g}_m.$$

Optionally, guard interval adder 118 may be coupled to parallel-to-serial converter 116 to add a guard interval for the OFDM signals. Guard interval adder 118 may add cyclic prefixes to OFDM signals (CP-OFDM). For example, guard interval adder 118 may copy the last $N_g$ samples of $\underline{x}_q$ and prefix them in front of the OFDM symbol x to generate a prefixed OFDM symbol $\underline{x}_q^{CP} = [x_{qN+N-N_g}, \ldots, x_{qN+N-1}, x_{qN}, x_{qN+1}, \ldots, x_{qN+N-1}]^T$.

In certain other embodiments, guard interval adder 118 may add zero padding to OFDM signals (ZP-OFDM) without adding any cyclic prefix. Guard interval adder 118 may place $N_g$ zeros in front of x to generate a zero-padded OFDM symbol $\underline{x}_q^{ZP} = [0, \ldots, 0, x_{qN}, x_{qN+1}, \ldots, x_{qN+N-1}]^T$.

As explained above, dispersive encoder 112 may also apply a grouped dispersive encoding configuration. For example, for OFDM signals with a cyclic prefix given by $N_g = N/Q$, where Q is an integer, dispersive encoder 112 may divide the sub-carriers and symbols into Q groups. Each group uses $N'=N/Q$ sub-carriers. The sub-carriers in each group are separated by Q. At the same time, the information symbols are partitioned into Q groups. The symbols in each group are dispersed over sub-carriers of one group. However, the sub-carriers of different groups are not overlapped. For example, where N=16, Q=4, and M=8, the encoding matrix $\underline{G} = [\underline{G}_0, \underline{G}_1, \ldots, \underline{G}_{M-1}]$ may be represented by:

$$G = \begin{bmatrix} G_{0,0} & 0 & 0 & 0 & 0 & 0 & 0 & 0 \\ 0 & 0 & G_{1,2} & 0 & 0 & 0 & 0 & 0 \\ 0 & 0 & 0 & 0 & G_{2,4} & 0 & 0 & 0 \\ 0 & 0 & 0 & 0 & 0 & 0 & G_{3,6} & 0 \\ G_{4,0} & G_{4,1} & 0 & 0 & 0 & 0 & 0 & 0 \\ 0 & 0 & G_{5,2} & G_{5,3} & 0 & 0 & 0 & 0 \\ 0 & 0 & 0 & 0 & G_{6,4} & G_{6,5} & 0 & 0 \\ 0 & 0 & 0 & 0 & 0 & 0 & G_{7,6} & G_{7,7} \\ G_{8,0} & G_{8,1} & 0 & 0 & 0 & 0 & 0 & 0 \\ 0 & 0 & G_{9,2} & G_{9,3} & 0 & 0 & 0 & 0 \\ 0 & 0 & 0 & 0 & G_{10,4} & G_{10,5} & 0 & 0 \\ 0 & 0 & 0 & 0 & 0 & 0 & G_{11,6} & G_{11,7} \\ 0 & G_{12,1} & 0 & 0 & 0 & 0 & 0 & 0 \\ 0 & 0 & 0 & G_{13,3} & 0 & 0 & 0 & 0 \\ 0 & 0 & 0 & 0 & 0 & G_{14,5} & 0 & 0 \\ 0 & 0 & 0 & 0 & 0 & 0 & 0 & G_{15,7} \end{bmatrix}$$

where columns 1 and 2 are group 0; columns 3 and 4 are group 1; columns 5 and 6 are group 2; and columns 7 and 8 are group 3. Further, for m-th group, where m ∈ {0, 1, 2, 3}, the corresponding sub-carriers may be calculated as: k=m+lQ, for l=0, 1, . . . , N/Q−1.

While the use of channel coding, interleaving, and turbo equalizing may be used to lower the bit-error rate (BER) of an OFDM system, the efficiency of the OFDM system may also be improved by desired spectral shaping.

As illustrated above, OFDM transmitter 410 may optionally add cyclic prefixes to encoded OFDM signals. OFDM transmitter 410 may generate different pulse shapes that suppress spectral side-lobes of the OFDM signals based on whether guard intervals are added. From equation (6), the time domain waveform of the OFDM signals is a superposition of $\underline{g}_m$, which is the IFFT of $\underline{G}_m = [G_{0,m}, G_{1,m}, \ldots, G_{N-1,m}]^T$, as in equations (4)-(5). Further, $\underline{g}_m$ is weighted by the symbols $D_m$, for m=0, 1, . . . , M−1.

Figure 6A:
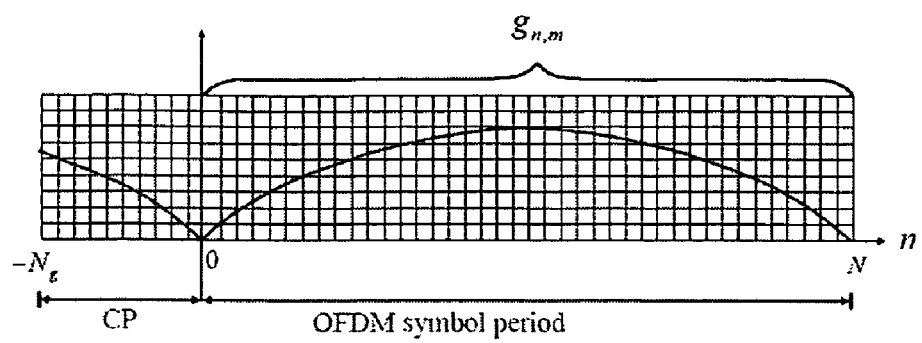
FIG. 6A shows a pulse shape or waveform of an OFDM signal without cyclic prefix, consistent with embodiments of the invention.

FIG. 6A shows an exemplary pulse shape or waveform of an OFDM signal without a cyclic prefix in the time domain. In FIG. 6A, the x-axis represents time and the y-axis represents the amplitude of the OFDM signal. The spectral side-lobes of the pulse $g_m$ is suppressed such that edges of side-lobe of the pulse are zeros, i.e., $g_{0,m} = g_{N,m} = 0$, for all m=0, 1, . . . , M−1.

Figure 6B:
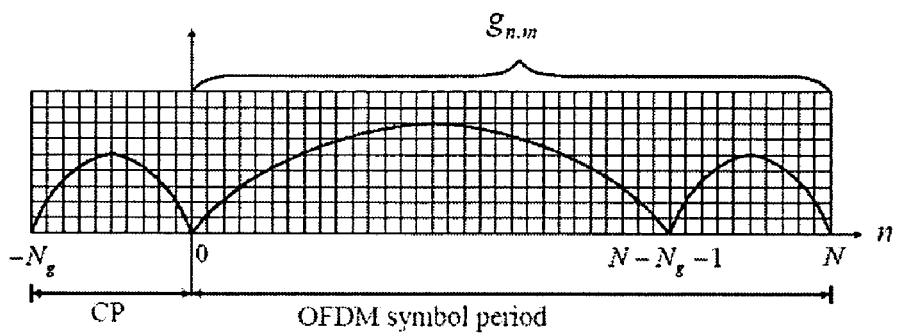
FIG. 6B shows a pulse shape of an OFDM signal with added cyclic prefix, consistent with embodiments of the invention.

FIG. 6B, which has the same x- and y-axis representations as in FIG. 6A, shows an exemplary pulse shape of an OFDM signal with an added cyclic prefix. Because the cyclic prefix is inserted, the waveform is discontinuous if $g_{N-N_g,m} \neq 0$. Therefore, to suppress side-lobes, the dispersive code is shaped such that the IFFT of the code has the property of $g_{0,m} = g_{N-N_g,m} = g_{N,m} = 0$, for all m=0, 1, . . . , M−1, as shown in FIG. 6B.

Figure 6C:
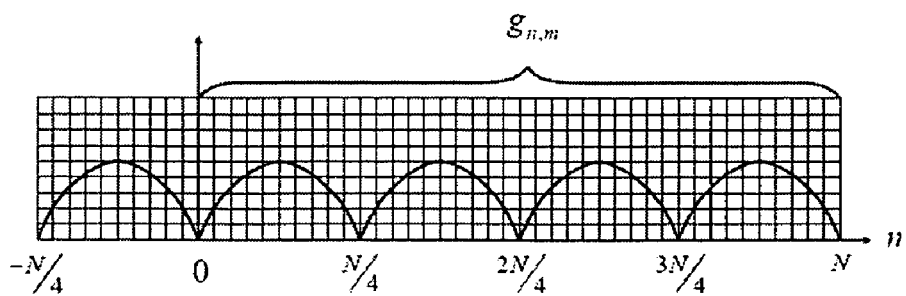
FIG. 6C shows an example where an OFDM symbol duration is an integer multiple of a guard interval.

FIG. 6C, which has the same x- and y-axis representations as in FIG. 6A, shows a case in which the OFDM symbol duration is an integer multiple of the guard interval, e.g., $N/N_g = Q$ is an integer, and $g_m$ is shaped as Q repeated equal size waveforms. The duration of each waveform equals the duration of the cyclic prefix. By using the repeated equal size waveforms, implementation of the dispersive code may be significantly simplified. For example, the implementation of the dispersive code in the frequency domain may be carried out by generating $\underline{G}_m$ such that the encoder coefficients are separated by Q−1 zeros. For example, when Q=4, the entries of $\underline{G}_m$ may be represented as:

$$\underline{G}_m = [0\ 0\ G_{2,4}\ 0\ 0\ 0\ G_{6,4}\ 0\ 0\ 0\ G_{10,4}\ 0\ 0\ 0\ 0\ 0]^T.$$

Other values, however, may also be assigned to Q.

The encoded OFDM signals, with or without added prefix, may be further combined with a carrier frequency and transmitted through a channel 430. For illustrative purposes, transmission characteristics of channel 430 may be represented by a channel impulse response h(t) and additive white Gaussian noise (AWGN) v(t). The transmitted signals y(t) may be further received by OFDM receiver 420.

After receiving the transmitted signals, OFDM receiver 420 provides the received signals to analog-to-discrete converter (ADC) 201 to convert received signals into discrete form. The converted discrete signals may be further provided to guard interval remover 202 to remove any added guard intervals or padded zeros. The received signals with cyclic prefix or padded zeros removed may be converted to parallel signals by serial-to-parallel converter 204 and may be further provided to N-point FFT unit 206.

FFT unit 206 may perform fast Fourier transform functions on the signals and may provide the transformed signals to dispersive decoder 422. The outputted signals from FFT unit 206 may be represented as equation (2). The transformed OFDM signals may be provided to dispersive decoder 422 for decoding operations, such as estimating the received information symbol.

Dispersive decoder 422 may include any appropriate decoder for decoding dispersively encoded OFDM signals. For example, dispersive decoder 422 may decode the encoded OFDM signals by applying a maximum-likelihood (ML) method, if prior information about $D_q$ is not known. The decoded signals may be represented by:

$$[\hat{D}_{qM+m}]_{m=0}^{M-1} = \arg \min_{[D_{qM+m}]_{m=0}^{M-1}} \left\| \underline{Y}_q - \underline{H}_q \underline{G}\ \underline{D}_q \right\|^2. \tag{7}$$

Other methods such as deduced-complexity algorithms, e.g., Viterbi algorithm, minimum mean squared error (MMSE) algorithm, zero forcing (ZF) algorithm, etc., may also be used.

Alternatively, OFDM system 400 may be configured to use iterative decoding as illustrated in FIGS. 2 and 3. Other configurations, however, may also be used.

In certain embodiments, a dispersive encoder 112 may generate orthonormal dispersive codes to reduce inter-symbol interference as well as complexity of the corresponding decoder. Orthonormal dispersive codes may refer to dispersive codes that are normalized and orthogonal with one another or with a relative matrix. For example, the dispersive encoder may generate a set of M orthonormal dispersive codes such that $$\underline{G}_m^H \underline{G}_n = \begin{cases} 1, & m = n, \\ 0, & m \neq n. \end{cases}$$

where the superscript H denotes complex conjugate transposition. Therefore, the orthonormal dispersive codes may have the property of $G^H G = I$, which may cause inter-symbol interference among the dispersive codes being canceled.

In the above example, an estimate of the symbol may be obtained by a zero-forcing technique as:

$$\hat{D}_q = [\hat{D}_{qM}, \hat{D}_{qM+1}, \ldots, \hat{D}_{qM+M-1}]^T = \underline{G}^H \underline{H}_1^{-1} \underline{Y}_q = \underline{D}_q + \underline{G}^H \underline{H}_q^{-1} \underline{V}_q \tag{8}$$

Figure 7:
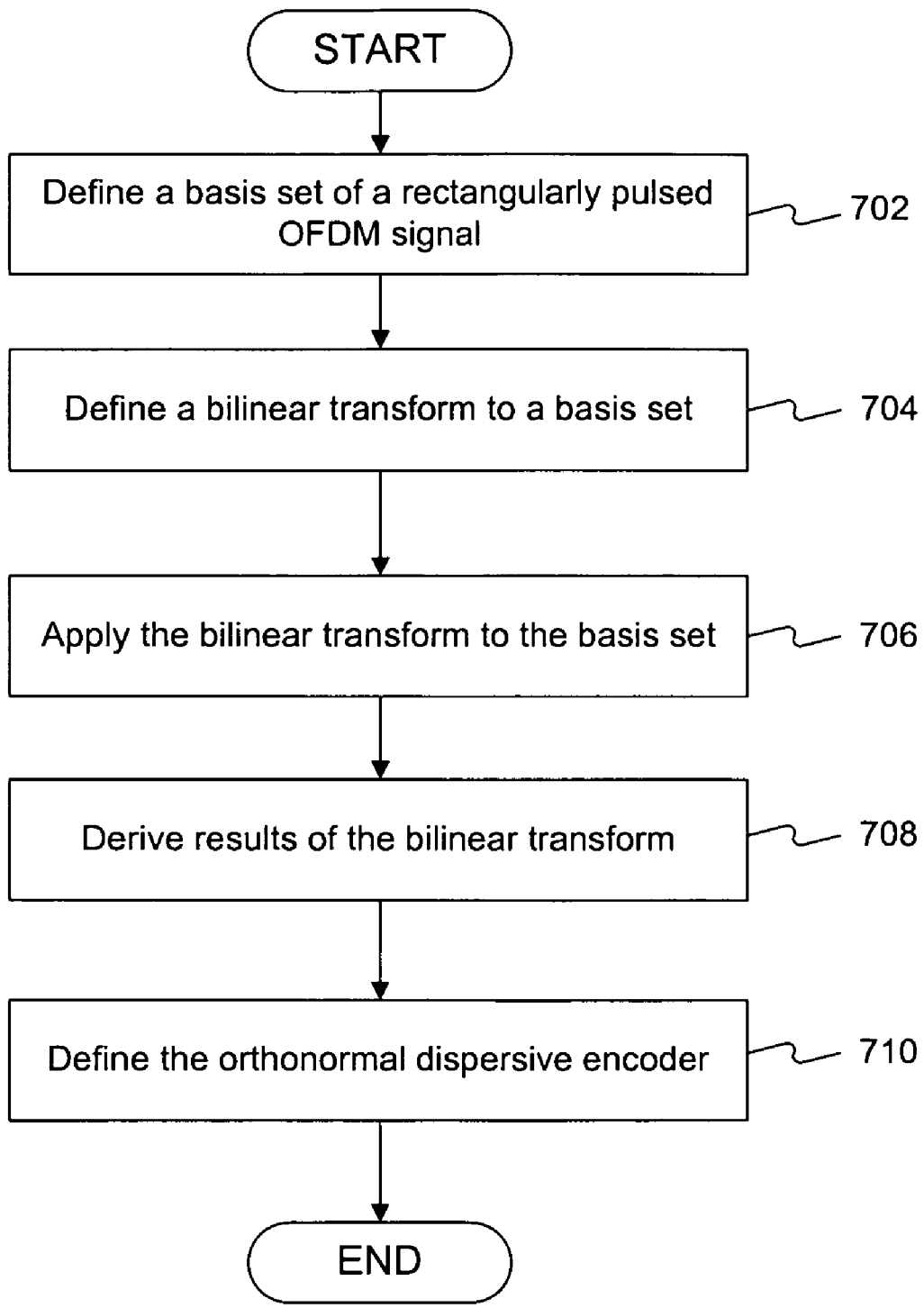
FIG. 7 shows an exemplary code design process for constructing orthonormal dispersive codes consistent with embodiments of the invention.

Also, edges of the IFFT of the dispersive codes may be zeros. FIG. 7 shows an exemplary code design process for constructing orthonormal dispersive codes consistent with embodiments of the invention. The design process may be performed by a computer or processor configured to design OFDM encoders, decoders, and/or related codes. The computer may include any appropriate type of computer system with a processor for performing various design processes.

As shown in FIG. 7, the computer may define a basis set of a rectangularly pulsed OFDM signal (step 702). For example, the computer may define the basis set of rectangularly pulsed OFDM signal as $$\Psi = \{C_n^{(0)}(t), S_n^{(0)}(t); n \in Z_N\} \quad (9)$$

where $Z_N$ denotes the set of integers $\{0, 1, \ldots, N-1\}$; t represents time; and $C_n^{(0)}(t)$ and $S_n^{(0)}(t)$ are quadrature carriers defined by $$C_n^{(m)}(t) = \sqrt{\frac{2}{T_d}} \cos\left(\left(\omega_0 + \frac{1}{2}m\omega_d + n\omega_d\right)t\right) \text{ and}$$

$$S_n^{(m)}(t) = \sqrt{\frac{2}{T_d}} \sin\left(\left(\omega_0 + \frac{1}{2}m\omega_d + n\omega_d\right)t\right),$$

respectively, where $$\omega_d = \frac{2\pi}{T_d}$$

is the sub-carrier spacing.

Further, the computer may define a bilinear transform to a basis set $\{h_n(t); n=0,1,\ldots,N-1\}$ (step 704). The computer may define the bilinear transform as:

$$\{h_n(t); n \in Z_n\} \Rightarrow \{\frac{1}{2}(h_{2n}(t) \pm h_{2n+1}(t)); n \in Z_{n/2}\}. \quad (10)$$

Because the orthonormality is preserved with this transformation, the output of this transform may also be a basis set. Further, the computer may also define certain other parameters that may be used in the bilinear transformation operations. For example, the computer may define the parameters $$P_n^{(c)}(t) = \sqrt{2}\cos\left(\frac{1}{2}n\omega_d t\right), P_n^{(s)}(t) = \sqrt{2}\sin\left(\frac{1}{2}n\omega_d t\right),$$

$\zeta(u) = 2^{u-1}-1$, and $\chi(u) = N(1-2^{1-u})$, the implementation of which is further described below.

The computer may apply the bilinear transform to the basis set of rectangularly pulsed OFDM signal $\Psi$ (step 706). After applying the bilinear transform, the computer may derive results of the bilinear transform (step 708). For example, the computer may output the following sets of bases for the orthonormal dispersive codes:

$$\Phi_1^{(c)} = \{P_1^{(c)}(t)C_{2n}^{(1)}(t), P_1^{(c)}(t)S_{2n}^{(1)}(t); n \in Z_{N/2}\} \quad (11)$$

$$\Phi_u^{(c)} = \left\{P_1^{(s)}(t)\left(\prod_{k=1}^{u-2} P_{2^k}^{(c)}(t)\right)P_{2^{u-1}}^{(s)}(t)C_{n2^u+\zeta(u)}^{(1)}(t),\right. \quad (12)$$

$$\left. P_1^{(s)}(t)\left(\prod_{k=1}^{u-2} P_{2^k}^{(c)}(t)\right)P_{2^{u-1}}^{(s)}(t)S_{n2^u+\zeta(n)}^{(1)}(t); n \in Z_{N/2^u}\right\},$$

$$u = 2, 3, \ldots, \log_2 N,$$

$$\Phi_u^{(d)} = \left\{P_1^{(s)}(t)\left(\prod_{k=1}^{u-1} P_{2^k}^{(c)}(t)\right)C_{n2^u+\zeta(u)}^{(1)}(t),\right. \quad (13)$$

$$\left. P_1^{(s)}(t)\left(\prod_{k=1}^{u-1} P_{2^k}^{(c)}(t)\right)S_{n2^u+\zeta(n)}^{(1)}(t); n \in Z_{N/2^u}\right\},$$

$$u = 2, 3, \ldots, \log_2 N,$$

$$\Theta_u^{(c)} = \left\{P_{N/2^u}^{(s)}(t)\left(\prod_{k=1}^{u-1} P_{N/2^k}^{(c)}(t)\right)C_{n+\frac{1}{2}\chi(u+1)}^{(0)}(t),\right. \quad (14)$$

$$\left. P_{N/2^u}^{(s)}(t)\left(\prod_{k=1}^{u-1} P_{N/2^k}^{(c)}(t)\right)S_{n+\frac{1}{2}\chi(u+1)}^{(0)}(t); n \in Z_{N/2^u}\right\},$$

$$u = 1, 2, \ldots, \log_2 N - 1,$$

$$\Theta_{\log_2 N}^{(c)} = \quad (15)$$

$$\left\{\prod_{k=1}^{\log_2 N} P_{N/2^k}^{(c)}(t)C_{n+\frac{1}{2}\chi(\log_2 N)}^{(1)}(t), \prod_{k=1}^{\log_2 N} P_{N/2^k}^{(c)}(t)S_{n+\frac{1}{2}\chi(\log_2 N)}^{(1)}(t)\right\},$$

$$\Theta_u^{(d)} = \quad (16)$$

$$\left\{\prod_{k=1}^{u} P_{N/2^k}^{(c)}(t)C_{n+\frac{1}{2}\chi(u+1)}^{(0)}(t), \prod_{k=1}^{u} P_{N/2^k}^{(c)}(t)S_{n+\frac{1}{2}\chi(u+1)}^{(0)}(t); n \in Z_{N/2^u}\right\},$$

$$u = 1, 2, \ldots, \log_2 N - 1,$$

$$\Theta_{\log_2 N}^{(d)} = \left\{P_1^{(s)}(t)\left(\prod_{k=1}^{\log_2 N - 1} P_{N/2^k}^{(c)}(t)\right)C_{\frac{1}{2}\chi(\log_2 N)}^{(1)}(t),\right. \quad (17)$$

$$\left. P_1^{(s)}(t)\left(\prod_{k=1}^{\log_2 N - 1} P_{N/2^k}^{(c)}(t)\right)S_{\frac{1}{2}\chi(\log_2 N)}^{(1)}(t)\right\}.$$

where $L \in \{1, 2, \ldots, \log_2 N\}$. The computer may also output $$W_L = \bigcup_{u=1}^{L} \Phi_u^{(c)}$$

as a basis set containing zero-edged continuous basis signals on $0 \leq t \leq T_d$; and $$V_L = \bigcup_{u=1}^{L} \Theta_u^{(c)}$$

as a basis set containing zero-edged continuous basis signals on $-T_d/2^q \leq t \leq T_d$, where q is a non-negative integer. As explained above, zero-edged signals may refer to signals with their spectral side-lobes suppressed such that edges of the side-lobes of the signals or the pulses of the signals are zero. Further, basis signals, as used herein, may represent signals used to construct certain dispersive encoders.

Further, the computer may also derive and output alternative expressions for $\Phi_u^{(c)}$ and $\Theta_u^{(c)}$ as:

$$\Phi_u^{(c)} = \left\{2^{-\frac{u}{2}}\sum_{v=0}^{2^u-1}(-1)^{1+\psi_{u,v}}C_{n2^u+v}^{(0)}(t),\right. \quad (18)$$

$$\left. 2^{-\frac{u}{2}}\sum_{v=0}^{2^u-1}(-1)^{1+\psi_{u,v}}S_{n2^u+v}^{(0)}(t); n \in Z_{N/2^u}\right\},$$

$$\Theta_u^{(c)} = \left\{2^{-\frac{u}{2}}\sum_{v=0}^{2^u-1}\phi_{u,v}C_{n+\frac{N}{2^u}v}^{(0)}(t), 2^{-\frac{u}{2}}\sum_{v=0}^{2^u-1}\phi_{u,v}S_{n+\frac{N}{2^u}v}^{(0)}(t); n \in Z_{N/2^u}\right\}. \quad (19)$$

where $\psi_{u,v}$ is the sum of most and least significant bits in the binary representation (in u bits) of the modulo-$2^u$ value of v when $u \geq 2$ and $\psi_{u,v}=1$ by default; and $\phi_{u,v}=1$ if $u=\log_2 n$ and $\phi_{u,v}=(-1)^{\zeta_v}$ otherwise, where $\zeta_v$ represents the least significant bit in the binary representation of v.

After deriving the basis set and other parameters, the computer may define the orthonormal dispersive encoder for construction of continuous-phase cyclic prefix OFDM signals (step 710). For example, the computer may define coefficients of a dispersive encoder in the form of:

$$G^{(V)}_{n+\frac{N}{2^u}v,\chi(u)+n} = 2^{\frac{-u}{2}} \phi_{u,v} \quad (20)$$

for $V_L$-based dispersive code, where $n \in Z_{N/2^u}$, $v \in Z_{2^u}$, for $u \in \{1, 2, \ldots, L\}$; and $$G^{(W)}_{n2^u+v,\chi(u)+n} = 2^{\frac{-u}{2}} (-1)^{1+\psi_{u,v}} \quad (21)$$

for $W_L$-based dispersive code, where $n \in Z_{N/2^u}$, $v \in Z_{2^u}$, for $u \in \{1, 2, \ldots, L\}$. More particularly, in an example of a $V_3$-based dispensive code with $N=8$, the dispersive encoder coefficient may be determined as:

$$G = \begin{bmatrix} 1/\sqrt{2} & 0 & 0 & 0 & 1/2 & 0 & 1/\sqrt{8} \\ 0 & 1/\sqrt{2} & 0 & 0 & 0 & 1/2 & -1/\sqrt{8} \\ 0 & 0 & 1/\sqrt{2} & 0 & -1/2 & 0 & 1/\sqrt{8} \\ 0 & 0 & 0 & 1/\sqrt{2} & 0 & -1/2 & -1/\sqrt{8} \\ -1/\sqrt{2} & 0 & 0 & 0 & 1/2 & 0 & 1/\sqrt{8} \\ 0 & -1/\sqrt{2} & 0 & 0 & 0 & 1/2 & -1/\sqrt{8} \\ 0 & 0 & -1/\sqrt{2} & 0 & -1/2 & 0 & 1/\sqrt{8} \\ 0 & 0 & 0 & -1/\sqrt{2} & - & -1/2 & -1/\sqrt{8} \end{bmatrix}.$$

After the dispersive encoder is defined, the defined dispersive encoder may be used for decoding operations illustrated in previous sections.

It is intended that the specification and examples be considered as exemplary only. Other embodiments of the invention will be apparent to those skilled in the art from consideration of the specification and practice of the invention disclosed herein.

What is claimed is:

1. An orthogonal frequency division multiplexing (OFDM) system, comprising:
   an OFDM transmitter configured to transmit OFDM signals through a communication channel, the OFDM transmitter comprising:
      a channel encoder configured to encode a plurality of information bits;
      an interleaver configured to interleave the channel-encoded information bits;
      a mapper configured to map the interleaved channel-encoded information bits into mapped multi-level symbols; and
      a dispersive encoder configured to dispersively encode the mapped symbols using a plurality of sub-carriers with various weights, wherein the dispersive encoder is constructed by:
         defining a first basis set of a rectangularly-pulsed OFDM signal;
         defining a bilinear transform;
         applying the bilinear transform to the first basis set of rectangularly-pulsed OFDM signal;
         constructing a second basis set containing zero-edged continuous basis signals; and
         constructing the dispersive encoder based on the second basis set; and
   an OFDM receiver configured to receive the transmitted OFDM signals and to iteratively decode the received OFDM signals based on a soft decision method.

2. The OFDM system according to claim 1, wherein the OFDM transmitter further include:
   an N-point inverse fast Fourier transform (IFFT) device coupled to the dispersive encoder and configured to modulate the dispersively encoded symbols with a plurality of sub-carriers; and
   a parallel-to-serial converter to convert outputs from the N-point IFFT device to an OFDM signal sequence.

3. The OFDM system according to claim 2, wherein the OFDM transmitter further include a guard interval adder configured to add a predetermined number of samples of the OFDM signal sequence to the OFDM signal sequence as a cyclic prefix.

4. The OFDM system according to claim 2, wherein the OFDM receiver includes an N-point fast Fourier transform (FFT) device configured to demodulate the received OFDM signals with the plurality of sub-carriers.

5. The OFDM system according to claim 4, wherein the OFDM receiver further includes a turbo equalizer configured to perform joint channel equalization and decoding of the FFT-transformed OFDM signals, the turbo equalizer comprising:
   a soft equalizer configured to process the FFT-transformed OFDM signals to produce a first soft estimate;
   a de-interleaver configured to de-interleave a first extrinsic information generated based on the first soft estimate;
   a soft decoder configured to process the de-interleaved first extrinsic information to produce a second soft estimate for combining with the de-interleaved first extrinsic information to form second extrinsic information; and
   an interleaver to interleave the second extrinsic information generated.

6. The OFDM system according to claim 5, wherein the soft equalizer and the soft decoder exchange the first soft estimate and the second soft estimate iteratively, and the soft decoder generates a desired soft estimate after a predetermined number of iterations.

7. The OFDM system according to claim 6, wherein the OFDM receiver further includes a decision device configured to determine an information bit of the received OFDM signals based on the desired soft estimate.

8. The OFDM system according to claim 7, wherein the OFDM receiver further includes a sink device coupled to the decision device and configured to process the determined information bit.

9. An orthogonal frequency division multiplexing (OFDM) transmitter, comprising:
   a dispersive encoder configured to disperse an information symbol over a plurality of sub-carriers with various weights into a plurality of symbols and to encode the plurality of symbols; and
   an N-point inverse fast Fourier transform (IFFT) device coupled to the dispersive encoder and configured to modulate the encoded plurality of symbols with the plurality of sub-carriers to generate an OFDM signal, wherein a spectrum of the dispersively-encoded OFDM signal falls off faster than that of a squared sinc function, and wherein the dispersive encoder is constructed by:

defining a first basis set of a rectangularly-pulsed OFDM signal;

defining a bilinear transform;

applying the bilinear transform to the first basis set of rectangularly-pulsed OFDM signal;

constructing a second basis set containing zero-edged continuous basis signals; and constructing the dispersive encoder based on the second basis set.

10. The OFDM transmitter according to claim 9, wherein the dispersive encoder encodes each of the plurality of symbols with a separate sub-carrier.

11. The OFDM transmitter according to claim 9, wherein the dispersive encoder encodes a group of symbols from the plurality of symbols with a predetermined group of sub-carriers.

12. The OFDM transmitter according to claim 9, further including:

a guard interval adder configured to add a predetermined number of padding zeros to the OFDM signal.

13. The OFDM transmitter according to claim 9, further including:

a guard interval adder configured to add a predetermined number of samples of the OFDM signal to the OFDM signal as a cyclic prefix.

14. The OFDM transmitter according to claim 12, wherein the OFDM signal has two lobes and edges of the two lobes are zeros.

15. The OFDM transmitter according to claim 13, wherein the OFDM signal has at least two lobes and the cyclic prefix of the OFDM signal has at least two lobes, and edges of all of the lobes are zeros.

16. The OFDM transmitter according to claim 9, wherein the dispersive encoder uses orthonormal dispersive codes.

17. An OFDM receiver for processing and decoding transmitted OFDM signals from the OFDM transmitter according to claim 9, the OFDM receiver including:

an N-point fast Fourier transform (FFT) device configured to demodulate the received OFDM signals with the plurality of sub-carriers; and a dispersive decoder configured to decode the demodulated OFDM signals based on a maximum-likelihood (ML) method.

* * * * *